US009729939B2

(12) United States Patent
Henry et al.

(10) Patent No.: US 9,729,939 B2
(45) Date of Patent: Aug. 8, 2017

(54) DISTRIBUTION OF MPEG-2 TS MULTIPLEXED MULTIMEDIA STREAM WITH SELECTION OF ELEMENTARY PACKETS OF THE STREAM

(75) Inventors: Jean-Baptiste Henry, Melesse (FR); Vincent Bottreau, Dijon (FR); Philippe Bordes, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 499 days.

(21) Appl. No.: 13/395,729

(22) PCT Filed: Sep. 10, 2010

(86) PCT No.: PCT/EP2010/063303
§ 371 (c)(1),
(2), (4) Date: May 21, 2012

(87) PCT Pub. No.: WO2011/029900
PCT Pub. Date: Mar. 17, 2011

(65) Prior Publication Data
US 2012/0224592 A1    Sep. 6, 2012

(30) Foreign Application Priority Data
Sep. 14, 2009  (FR) ..................................... 09 56303

(51) Int. Cl.
*H04J 3/24*    (2006.01)
*H04N 21/647*  (2011.01)
(Continued)

(52) U.S. Cl.
CPC ... *H04N 21/64792* (2013.01); *H04N 21/2385* (2013.01); *H04N 21/234327* (2013.01);
(Continued)

(58) Field of Classification Search
CPC .............. H04W 4/06; H04N 21/64792; H04N 21/234327; H04N 21/26216
See application file for complete search history.

(56) References Cited

U.S. PATENT DOCUMENTS 6,172,988 B1 * 1/2001 Tiernan ................... H04L 29/06
                                                   348/E7.077
7,664,113 B2 * 2/2010 Ding et al. ..................... 370/392
(Continued)

FOREIGN PATENT DOCUMENTS

EP    1742476 A1    1/2007
EP    1773063       4/2007
(Continued)

OTHER PUBLICATIONS

Wenger et al., "Transport and Signaling of SVC in IP Networks," IEEE Transactions on Circuits and Systems for Video Techology, NJ, US, vol. 17, No. 9, Sep. 1, 2007, pp. 1164-1173.
(Continued)

*Primary Examiner* — Gregory Sefcheck
*Assistant Examiner* — Jael Ulysse
(74) *Attorney, Agent, or Firm* — Tutunjian & Bitetto, P.C.

(57) ABSTRACT

The invention relates to a distribution method for a multimedia stream multiplexed via a network, the multiplexed multimedia stream comprising multimedia and signalling components, the components being divided into elementary packets of the multiplexed multimedia stream transmitted on at least one transport channel of the network. This method comprises a step of selection of elementary packets of the multiplexed multimedia stream incorporated in transport packets, wherein each of the elementary packets of the signalling components are incorporated in transport packets transmitted on a first of the at least one transport channel, and wherein others transport packets comprising at least one elementary packet and a part only of the multimedia com-
(Continued)

ponents, are transmitted on a transport channel. This method further comprises a step of transmission of transport packets on each of the transport channels, comprising a step of definition of a first sequence number for each of the transport packets of each of the transport channels and a second sequence number for each of the elementary packets, the first sequence number being incremented for each of the transport packets, independently on each of the transport channels, the second sequence number being incremented for each of the elementary packets.

24 Claims, 10 Drawing Sheets

(51) Int. Cl.
    *H04N 21/2343* (2011.01)
    *H04N 21/2385* (2011.01)
    *H04N 21/262* (2011.01)
    *H04N 21/434* (2011.01)
    *H04N 21/63* (2011.01)
    *H04N 21/6405* (2011.01)
    *H04N 21/643* (2011.01)
    *H04N 21/6437* (2011.01)
    *H04N 21/658* (2011.01)

(52) U.S. Cl.
    CPC ... *H04N 21/26216* (2013.01); *H04N 21/4344* (2013.01); *H04N 21/631* (2013.01); *H04N 21/6405* (2013.01); *H04N 21/6437* (2013.01); *H04N 21/64322* (2013.01); *H04N 21/6582* (2013.01)

(56) References Cited

U.S. PATENT DOCUMENTS

| | | | | |
|---|---|---|---|---|
| 7,953,194 | B2* | 5/2011 | Chen et al. | 375/354 |
| 8,340,113 | B2* | 12/2012 | Einarsson et al. | 370/431 |
| 2002/0037160 | A1* | 3/2002 | Locket | G11B 27/031 386/230 |
| 2002/0064189 | A1* | 5/2002 | Coupe | H04N 21/434 370/537 |
| 2002/0141431 | A1* | 10/2002 | Tripathy | H04N 9/8042 370/428 |
| 2002/0150126 | A1* | 10/2002 | Kovacevic | G11B 27/10 370/503 |
| 2003/0043798 | A1* | 3/2003 | Pugel | 370/389 |
| 2005/0036557 | A1* | 2/2005 | Balakrishnan | H04N 21/23424 375/240.28 |
| 2005/0166123 | A1* | 7/2005 | Yanamoto et al. | 714/776 |
| 2005/0201471 | A1* | 9/2005 | Hannuksela | H04N 21/44004 375/240.25 |
| 2005/0226415 | A1* | 10/2005 | Kubota | H04N 7/24 380/210 |
| 2006/0037041 | A1* | 2/2006 | Zhang | H04N 7/1675 725/32 |
| 2006/0114990 | A1 | 6/2006 | Pak | |
| 2007/0112811 | A1 | 5/2007 | Shen et al. | |
| 2007/0177636 | A1* | 8/2007 | Chae | H04H 20/02 370/535 |
| 2008/0089597 | A1 | 4/2008 | Guo et al. | |
| 2008/0112406 | A1* | 5/2008 | Ding | H04N 7/52 370/389 |
| 2008/0123692 | A1* | 5/2008 | Jung | H04N 21/23608 370/516 |
| 2008/0313678 | A1* | 12/2008 | Ryu | H04N 21/2381 725/62 |
| 2009/0083434 | A1 | 3/2009 | Wang et al. | |
| 2009/0168649 | A1* | 7/2009 | Assouline | H04L 12/2801 370/230 |
| 2009/0177952 | A1* | 7/2009 | Yokosato | H04N 21/234309 714/799 |
| 2009/0201990 | A1* | 8/2009 | Leprovost | H04N 21/234327 375/240.12 |
| 2009/0268806 | A1* | 10/2009 | Kim | H04N 21/234327 375/240.01 |
| 2009/0296624 | A1* | 12/2009 | Ryu et al. | 370/312 |
| 2012/0047278 | A1* | 2/2012 | Groos et al. | 709/231 |
| 2012/0224592 | A1* | 9/2012 | Henry | H04N 21/234327 370/474 |

FOREIGN PATENT DOCUMENTS

| | | |
|---|---|---|
| EP | 2086237 | 8/2009 |
| EP | 2175651 A1 | 4/2010 |
| JP | 11225168 A2 | 8/1999 |
| JP | 2000232632 A2 | 8/2000 |
| WO | WO2007081148 A1 | 7/2007 |
| WO | WO2009001211 A2 | 12/2008 |
| WO | WO2009016835 A1 | 2/2009 |

OTHER PUBLICATIONS

Search Report Dataed Dec. 6, 2010.
Gao, K. et al., "Real-Time Scheduling for Scalable Video Coding Streaming System," Mar. 2006. pp. 1-4.
Handley,M. et al., "SDP: Session Description Protocol," Jul. 2006. pp. 1-49.
Hoffman, D. et al., "RTP Payload Format for MPEG1/MPEG2 Video," Jan. 1998. pp. 1- 16.
"Generic Coding of Moving Pictures and Associated Audio," Mar. 1994. pp. 1-202.
Park,C. et al., "Video Transmission Adopting Scalable Video Coding over Time-varying Networks," Apr. 2006. pp. 689-695. vol. 52. Issue 2.
Schulzrinne,H. et al., "RTP: A Transport Protocol for Real-Time Applications," Jul. 2003. pp. 1-89.
"Digital Video Broadcasting (DVB); Transport of MPEG-2 TS Based DVB Services over IP Based Networks," ETSI TS 102 034 V1.4.1 (Aug. 2009). pp. 1-229.
Wenger,S. et al., "RTP payload format for H.264/SVC scalable video coding," May 2006. pp. 657-667.

* cited by examiner

DISTRIBUTION OF MPEG-2 TS MULTIPLEXED MULTIMEDIA STREAM WITH SELECTION OF ELEMENTARY PACKETS OF THE STREAM

This application claims the benefit, under 35 U.S.C. §365 of International Application PCT/EP2010/063303, filed Sep. 10, 2010, which was published in accordance with PCT Article 21(2) on Mar. 17, 2011 in English and which claims the benefit of French patent application No. 0956303, filed Sep. 14, 2009.

SCOPE OF THE INVENTION

The invention relates to the general domain of content distribution via a network. More particularly, the invention relates to a distribution method for a multiplexed multimedia stream via a network, over at least one transport channel.

PRIOR ART

Numerous content providers propose over a network, in particular a computing network such as Internet, digital contents preferentially audio and/or video, more commonly called programmes. Different technical solutions relating to the transport, multiplexing or encoding of data, are implemented by these providers to transport one or more programmes intended for reception terminals.

A multicast diffusion method is advantageously used to distribute these contents over the network. For example on a network such as the Internet, this method consists in transmitting, from a server, packets of IP data carrying the contents to be transmitted. Upon request of a reception terminal, these IP packets are then transmitted (duplicated if necessary) via routers, that is to say network nodes, and routed via the network to the reception terminal on an IP transport channel. Other diffusion methods exist such as broadcast diffusion in which the network routes the packets intended for connected reception terminals, or such as unicast diffusion in which upon a request from a reception terminal, the server transmits IP packets that are then routed to the reception terminal via the routers on an IP transport channel. The multicast diffusion has the advantage with respect to a broadcast diffusion of not flooding the network with data, in addition it has the advantage with respect to a unicast diffusion of not saturating the server with requests from reception terminals.

Moreover, the distribution of contents via a network can use "Transport Stream" technology, noted as TS or MPEG2-TS, from the standard MPEG2 (in ISO/IEC International Standard 13818; "Generic coding of moving pictures and associated audio information", November 1994) generally widespread in the diffusion domain be it satellite, cable or terrestrial. This transport stream enables the multiplexing of encoded video and audio streams from the same programme, with a common time base. The transport stream also enables the multiplexing of encoded video and audio streams from several programmes, having independent time bases. For this purpose, the TS technology offers tools for the synchronization during the coding of multiple encoded streams, the interleaving of several streams encoded into a single stream, the re-initialisation of buffer memories at the start of the decoding, the permanent management of buffer memories, the temporal identification, the multiplexing and signalling of diverse components of a stream system. These signalling data are also called metadata and are associated with the components of a same encoded multimedia content, such as the audio components, video, sub-titles or private data. The TS stream is thus a multiplexed multimedia stream comprising the audio components, video or other different programmes and cut into elementary packets. The TS stream is used in the case of diffusion on an IP channel, particularly in the case of a multicast diffusion. Technical solutions are for example defined by Hoffman et al in "RTP Payload Format for MPEG1/MPEG2 Video" (RFC 2250, January 1998) in the case of the distribution of such a stream on an IP channel.

Finally, the SVC (Scalable Video Coding) scalable video coding technology enables having a scalable content, that is to say the content can be encoded once into one or several encoded binary streams offer different bitrates with different qualities. The SVC technology thus enables a same content to be encoded and distributed to different terminals whether they are mobile terminals comprising a small screen, terminals connected to a computing network limited by the bitrate or terminals offering a high definition image quality. Scalability is the possibility to be able to represent a signal at different information levels. The signal is coded in a single binary stream, in a way to offer the possibility of decoding a base layer, and in the enhancement layers in which the quality increases successively. Three types of scalability are defined: spatial scalability that enables several levels of resolution to be offered, temporal scalability that enables several temporal frequencies of the signal, and quality scalability that enables different image qualities to be offered. Hence, for example, a base layer encodes the content for a low resolution image (such as for mobile terminals), while a first enhancement layer can encode additional information for a standard resolution (such as for a standard television), finally other enhancement layers encode the content for a better quality of higher resolution (for example for a high definition television). Each terminal will use a set of streams corresponding to its decoding power and resolution and will not use additional streams.

In the case of the distribution of an SVC stream on a network such as Internet, there are technical solutions (for example defined by Wenger et al. in "RTP Payload Format for SVC Video" draft-ietf-avt-rtp-svc-18, March 2009) to transport the stream using several transport channels, one channel per component (or SCV stream) for example. These technical solutions are particularly well adapted for adjusting the bitrate of data transmitted to the bandwidth available on the network. However these technical solutions present a complex data synchronization as the data transmitted on an IP network in a same channel and in particular in different channels are not received in an ordered manner at the terminal level. Moreover, the TS technology is widely deployed by satellite, cable or terrestrial diffusion Also, whatever the encoding method of audiovisual contents, SVC or not, the technology of the transport stream TS, with its synchronization tools, is widely used to distribute contents on Internet. If the use of a multiplexed multimedia stream such as TS enables the problems of synchronization to be resolved, it has one major disadvantage: all of the SVC streams are transmitted in a same transport stream, even those that are not concerned with the terminal. This technical solution thus leads to a waste of the network bandwidth, which is particularly disadvantageous when the bandwidth constraints on the last link, that is to say the last router and the terminal, are significant.

These diffusion methods present the technical problem of distributing a multiplexed multimedia stream on a network, such as the transport stream MPEG2-TS, while simply transmitting to the reception terminals the only multimedia components used.

SUMMARY OF THE INVENTION

The purpose of the invention is to overcome at least one of the disadvantages of the prior art by proposing a distribution method for a multimedia stream multiplexed on one or several transport channels, adapting to the requirements of reception terminals and optimizing the bandwidth resources of the network. In the prior art, the different multimedia components of a multiplexed stream, either are all transmitted via a same transport channel to a reception terminal, or are transported independently each on different transport channels implementing complex synchronization methods. The principle of the invention is to conserve the multiplexed multimedia stream and to fragment it at transport packet level on one of the transport channels of the network. Thus the metadata for example defined for the navigation and/or the synchronization of the multiplexed stream are advantageously transmitted with all or part of the audio and video components.

For this purpose, the invention relates to a distribution method for a multiplexed multimedia stream via a network, implemented in a transmitter, the multiplexed multimedia stream comprising multimedia and signalling components, the components being divided into elementary packets of the multiplexed multimedia stream transmitted on at least one transport channel of the network, this method comprising a step of selection of elementary packets of the multiplexed multimedia stream incorporated into the transport packets, each of the transport packets comprising at least an elementary packet and a part only of components, and each of the transport packets being transmitted on one of the at least one transport channels, a step of transmission of transport packets on each of the at least one transport channels, comprising a step of definition of a first sequence number for each of the transport packets of each of the at least one transport channels and a second sequence number for each of the elementary packets, the first channel sequence number being incremented for each of the transport packets, independently on each of the at least one transport channels, the second sequence number being incremented for each of said elementary packets.

Generally a multiplexed multimedia stream distributed over several transport channels of a network is divided at the level of its audio or video components. The reception of transport packets, the ordering of different packets so as to reconstruct the different components of a programme and the synchronization of these components thus implement complex technical solutions The fragmentation of the stream into transport packets, that is to say the selection of elementary packets of the stream incorporated in the transport packets, in which the transport channel only carries some of the multimedia components of the initial stream but conserves the metadata associated with the initial stream, is particularly well adapted to a distribution of contents adapting to the requirements of terminals and to the bandwidth of the network. The particular sequence numbers are a simple technical solution to reconstruct the multimedia stream from transport packets received on different channels.

According to a particularly advantageous aspect of the invention, the multiplexed multimedia stream is a "Transport Stream", noted as MPEG2-TS. According to particular characteristics of the invention, the distribution is a multicast diffusion on an IP network and the transport channel corresponds to a multicast address. According to another particular characteristic of the invention, the transmission protocol on the IP network is RTP. The method is thus particularly well adapted to diffusion on an IP network of an SVC stream encapsulated in an MPEG2-TS transport stream enabling in a simple manner a terminal to receive only the SVC streams respecting its constraints in bandwidth or decoding power.

According to another particularly advantageous aspect of the invention, it comprises a first step of transmission of a description of the content of each of the transport channels. In addition according to a particular characteristic of the invention the description of the content of each of the transport channels is comprised in a "Session Description Protocol" file noted as SDP. The description of the content of each of the transport channels, for example using the SDP protocol for the IP networks, provides information on the addresses of each of the transport channels, on the diffusion method comprising a step of selection of elementary packets of the multimedia stream, or on the components carried by each of the channels. This information informs the reception terminal for the step of selection of a transport channel. The transmission of the content description of transport channels comprises for example the multicast diffusion of the description or the making available on a server, of the reception terminals that have downloaded the file.

According to a particular characteristic of the invention, the method comprises a step of reception of a request for selection of multimedia components to be transmitted in a transport channel. According to particular characteristics of the invention, the distribution is a unicast diffusion on an IP network and the transport channel corresponds to a unicast address. The selection request of multimedia components to be transmitted in a transport channel informs the server on the expected transport channel according to its content provided for example by its description. A unicast diffusion for distribution on IP network where the transport channel corresponds to a unicast address is particularly well adapted in the case of selection of elementary packets of a multimedia stream on demand from the reception terminal.

The invention also relates to a reception method for a multiplexed multimedia stream distributed via a network, implemented in a receiver, the multiplexed multimedia stream comprising multimedia and signalling components, the components being divided into elementary packets of the multiplexed multimedia stream transmitted on at least on transport channel, this method comprising a step of selection of at least one transport channel of transport packets from a selection of elementary packets of the multiplexed multimedia stream, each of the transport packets comprising at least one elementary packet and one part only of components, a step of reception of transport packets of a transport channel using a first sequence number defined for each of the transport packets of each of the at least one transport channels, the first number of the sequence being incremented for each of the transport packets and a step of reconstruction of the multimedia stream multiplexed using a second sequence number defined for each of the elementary packets of the multiplexed multimedia stream, the second sequence number being incremented for each of the elementary packets.

Hence, during the step of selection of a transport channel, a terminal can advantageously select to receive only the useful components of the multimedia stream distributed by the server according to the method of the invention. The useful components are for example determined according to the bandwidth of the network, notably the constraints on the link between the last router and the terminal but also according to the capacities of the audio/video decoder, the display resolution or the user choice. During the step of reception, the terminal uses the first sequence numbers to order the transport packets received on a transport channel selected in the preceding step. The terminal orders the transport packets for each of the transport channels independently from one channel to another. Then, during the step of reconstruction, the terminal uses the second sequence numbers to order the elementary packets of the multimedia stream received on the different channels. The multimedia stream thus partially or completely reconstructed according to the components received, is then processed by the de-multiplexer or the audio/video decoder. This reception method proposes a simple technical solution of a terminal to only receive the useful components of a multimedia stream in ordered form and possibly associated with signalling metadata of the multiplexed stream.

According to a particularly advantageous aspect of the invention, the reception method comprises a step of detection of loss of transport packets using the first number of the sequence defined for each of the transport packets. This step is particularly well adapted on networks where the loss of packets is common and thus enables network reliability solutions to be activated such as the retransmission of packets.

According to a particularly advantageous aspect of the invention, the step of selection of at least one transport channel uses a description of the content of each of the transport channels previously transmitted. In addition according to a particular characteristic of the invention the description of the content of each of the transport channels is comprised in a "Session Description Protocol" file noted as SDP. The reception terminal can select the transport channel or channels using information on the addresses of each of the transport channels, on the diffusion method comprising a step of selection of elementary packets of the multimedia stream, or on the components carried by each of the channels, this information is advantageously provided via the description of the content of each of the transport channels, for example using the SDP protocol for the IP networks.

According to a particular characteristic of the invention, the method comprises a step of transmission of a request for selection of multimedia components to be transmitted in a transport channel. During this step, the terminal using components determined from a multiplexed multimedia stream, advantageously inform the server on the expected transport channel on reception of its content provided for example by its description and thus receives, on a selected channel, the transport packets from the step of selection of elementary packets of the multimedia stream carrying these components in accordance with its request. A unicast diffusion for distribution on IP network where the transport channel corresponds to a unicast address is particularly well adapted in the case of the distribution of a multimedia stream on demand from the reception terminal.

The invention also relates to a device for the implementation of the distribution method defined above comprising the means of selection of elementary packets of the multiplexed multimedia stream incorporated in transport packets, each of the transport packets comprising at least one elementary packet and a part only of components, and each of the transport packets being transmitted on a transport channel, the means of transmission of transport packets on each of the at least one transport channels, comprising the means of definition of a first sequence number for each of the transport packets of each of the at least one transport channel and a second sequence number for each of the elementary packets, the first sequence number being incremented for each of the transport packets independently on each of the at least one transport channels, the second sequence number being incremented for each of the elementary packets.

The invention also relates to a device for the implementation of the reception method defined above comprising the means of selection of at least one transport channel for transport packets from a selection of elementary packets of the multiplexed multimedia stream, the transport packets comprising at least one elementary packet and a part only of components, means of reception of transport packets of a transport channel, using a first sequence number defined for each of the transport packets of each of the at least transport channels, the first sequence number being incremented for each of the transport packets independently on each of the at least one transport channels, and the means of reconstruction of the multiplexed multimedia stream using a second sequence number defined for each of the elementary packets of the multiplexed multimedia stream, the second sequence number being incremented for each of said elementary packets.

BRIEF DESCRIPTION OF THE FIGURES

The invention will be better understood and illustrated by means of embodiments and advantageous implementations, by no means limiting, with reference to the figures in the appendix, wherein.

DETAILED DESCRIPTION OF EMBODIMENTS OF THE INVENTION

The distribution of contents via a network comprises a step of temporal multiplexing of one or several contents in a multimedia stream followed by a step of diffusion of the multimedia stream on the network to one or several terminals.

Figure 1:
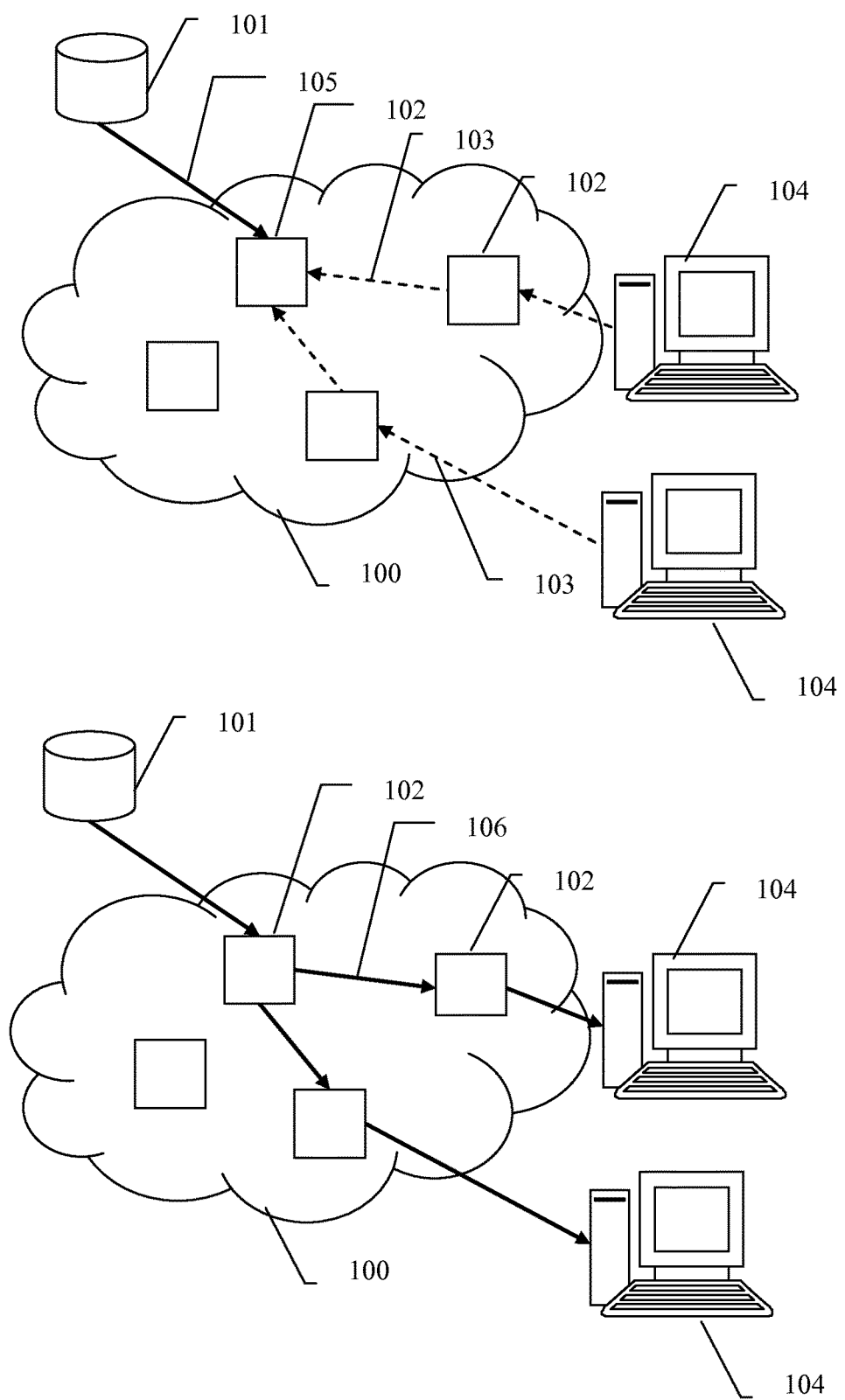
FIG. 1 shows a multicast diffusion as data distribution model.

FIG. 1 diagrammatically shows the multicast diffusion in the case of a computing network such as the Internet. However multicast diffusion is also used in other networks, for example wireless networks or mobile telephone networks can be cited. Multicast diffusion consists in transmitting via a computing network 100 from a server 101, IP data packets 105 carrying the contents to be transmitted to a first router 102, that is to say a network node. Upon request 103 of a reception terminal 104, these IP packets 106 are then routed by routers 102, and routed via the network to the reception terminal 104 on an IP transport channel defined by a multicast address. Multicast diffusion is a good compromise between the use of the bandwidth (the transport packets 106 are not carried in the network except on request if a terminal 104) and the saturation of the server with respect to the request of the reception terminals (the requests 103 are only transmitted between the routers 102 of the network, as far as the first router). The distribution method according to the invention is particularly well adapted to this type of diffusion but the invention is not limited to this diffusion mode, hence a variant using a unicast diffusion mode will be detailed hereafter.

In addition, the contents to be distributed in one or more binary streams are encapsulated in a multiplexed multimedia stream. In fact, the content comprise different data types. By multimedia component are defined, each of these types and for example video components, audio components, sub-title components and the components of different streams of a scalable video (SVC) can be cited. These components are associated with an identifier, the identifier is a metadata in the sense that it gives information on the elements comprised in the multiplexed multimedia stream. Different metadata are defined in a stream, for example to identify different contents or programmes.

Figure 2:
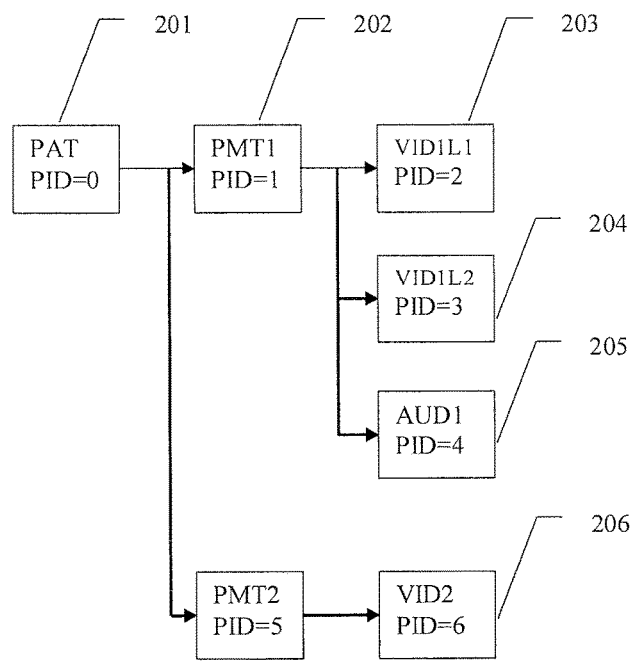
FIG. 2 shows the navigation metadata in an MPEG2-TS transport stream.
Figure 3:
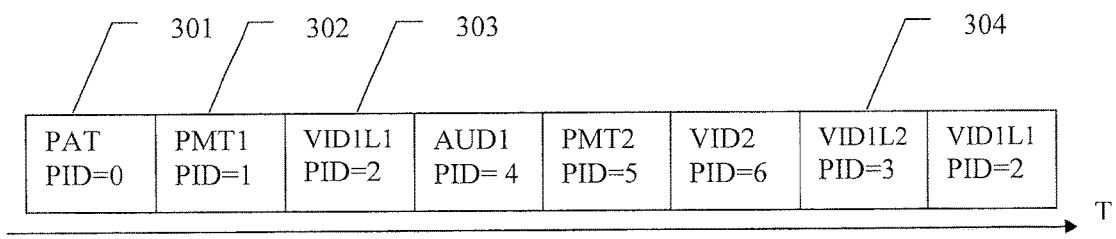
FIG. 3 shows the temporal multiplexing in an MPEG2-TS transport stream.

According to an embodiment of the invention, the distribution of contents via a network uses the technology of the "Transport Stream" noted as TS or MPEG2-TS, from the MPEG2 standard. A multiplexed binary stream in accordance with the MPEG2 standard is either a transport stream or a programme stream. These two streams are constructed from PES packets and PSI packets, these latter containing the other items of necessary information called metadata. These two streams enabling the multiplexing of encoded video and audio streams from a same programme, with a common time base. The transport stream also enables the multiplexing of encoded video and audio streams from several programmes, having independent time bases. FIG. 2 shows the navigation metadata in an MPEG2-TS transport stream, Each elementary packet whether a PES packet or a PSI packet, is identified by a PID (Packet Identifier). The PID null 201 identifies the PAT (Program Association Table) that lists al the programmes in the multiplexed stream. Information on these programmes, notably their location in the stream, the location of the PCR used for the synchronization, is contained in the packets PMT 202 (Program Map Table). Programme 1 comprises for example an encoded SVC video constituted of two components VID1L1 203, VID1L2 204 and an audio component 205, programme 2 comprises a video component VID2 206. FIG. 3 shows the temporal multiplexing of the different components in an MPEG2-TS transport stream. Thus, the binary stream comprises the PAT 301, the PMT 302 then the different elementary packets, noted PES in the case of the MPEG2-TS of the video component VID1L1 303 and the video component VID1L2 304.

Naturally, the invention is not limited to the MPEG2-TS transport stream, any other multiplexing technology is compatible with the invention. However, the multiplexed multimedia stream according to the invention comprises the components of one or several programmes or contents. The different multimedia components are for example, video streams, possibly encoded according to a scalable model thus constituted of a base stream and one or several enhancement streams, or video streams encoded for displaying in the image i.e. PIP (Picture In Picture), audio streams possibly for different languages such as French, English, sub-title streams. The signalling components comprise metadata associated with for example navigation or synchronization in the stream. The components, known as multimedia and signalization components, are divided into packets. The set of these packets consist of elementary packets of the multimedia stream multiplexed according to the invention.

Figure 4:
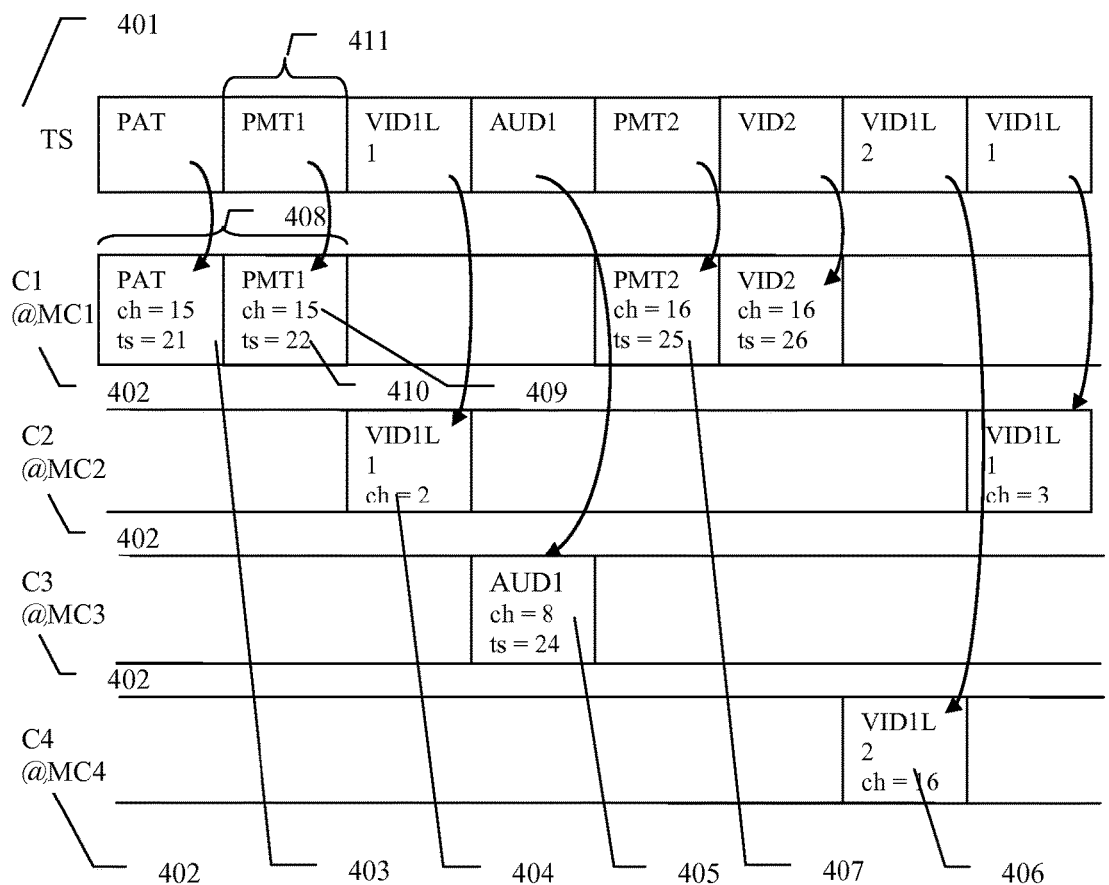
FIG. 4 shows the selection method of elementary packets of the multiplexed multimedia stream incorporated in transport packets of a preferred embodiment of the invention.

The principle of the invention is to conserve the structure and the tools of the multiplexed multimedia stream and to select elementary packets of the original stream incorporated in the transport packets transmitted on one of the transport channels of the network. In addition, the specific numbering of the transport packets and the elementary packets of the stream enable the reconstruction of the stream in the reception terminal to be simplified. FIG. 4 shows the selection method of elementary packets of the multiplexed multimedia stream incorporated in transport packets of a preferred embodiment of the invention. The multiplexed multimedia stream 401, for example the TS stream shown in FIG. 3, divided into elementary packets is shown in FIG. 4. Four transport channels 402 noted as C1 to C4, corresponding for example to four multicast addresses noted as @MC1 to @MC4, carry in the transport packets, the elementary packets of the TS stream 401 corresponding to a given component. Hence, the channel C1 transports the packets of metadata (or PSI packets) such as PAT 403 as well as the multimedia packets (or PES packets) of the video component VID2 of programme 2. The channel C2 transports the elementary packets of the base stream VID1L1 404 of the video of the programme 1 and the channel C4 transports those of the enhancement stream VID1L2 406. Finally the channel C3 transports the multimedia packets of the audio components AUDI 405 of programme 1. Each of the transport packets transmitted on one of the channels C1 to C4 comprises at least on elementary packet (PSI or PES), and a part only of the components (PSI and VID2 for channel C1, VID1L1 for channel C2, etc.). This step of selection of elementary packets incorporated in the transport packets enables the TS stream 401 to be distributed on four channels 402 while conserving the metadata 403. Hence, a terminal, limited by the bandwidth of its access network, will receive for example only the channel C1 at the address @MC1 if it is interested in the programme 2 or the channels C1, C2 and C3 if it is interested by programme 1. However, the terminal will not receive the channel C4, limiting thus the quantity of information to the terminal. In addition, when the transport packets are transmitted on a transport channel, a first sequence number, noted as channel sequence number, is defined for each of the transport packets of a channel and a second sequence number, noted as TS sequence number is defined for each of the elementary packets. The first number or channel sequence number is incremented for each of the transport packets, independently on each transport channel. The second number or TS sequence number is incremented for each elementary packet. Hence, if a transport packet is considered comprising the packets PAT 403 and PMT, the transport packet carries the channel sequence number 15, while the packets PAT and PMT carry respectively the TS sequence number 21 and 22. The elementary packet 404 in the outgoing TS stream carries the TS sequence number 23 while the next transport packet on the channel C1 407 carries the channel sequence number 16. The use of this numbering will be described below with the reception method in accordance with one of the embodiments of the invention.

The previous embodiment describes the distribution of an MPEG2-TS stream on an IP network where the transport channel corresponds to a multicast address. Naturally, the invention is not limited to the embodiment.

Figure 5:
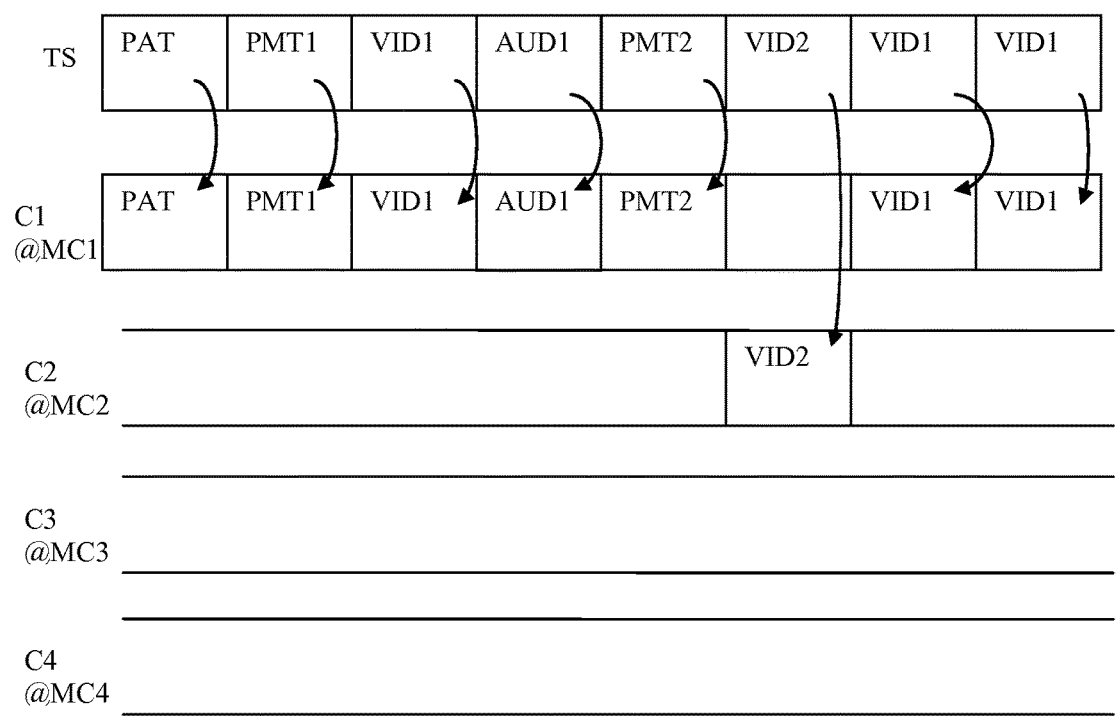
FIG. 5 shows the selection method of elementary packets of the multiplexed multimedia stream incorporated in transport packets according to a particular embodiment.

In addition, according to a particular embodiment, the distribution model is compatible with terminals that are not adapted to the reception of a fragmented stream and transmitted on several channels. FIG. 5 shows the step of selection of elementary packets of the multiplexed multimedia stream incorporated in transport packets according to a particular embodiment known as the compatible embodiment. For this purpose, all the elementary packets of the multiplexed multimedia stream corresponding to the programme 1 are advantageously transmitted on the channel C1, while the elementary packets of programme 2 are transmitted on C2. Thus a terminal receives on a channel C1 all the components of programme 1 as well as the metadata of the outgoing stream, it is then able to decode the programme 1, while not having received the components of programme 2. This method is particularly well adapted to a content provider that wants to distribute additional contents such as the programme 2 in a same multiplexed stream intended for a set of terminals for example having a greater bandwidth without interfering with the distribution to other terminals.

Figure 6:
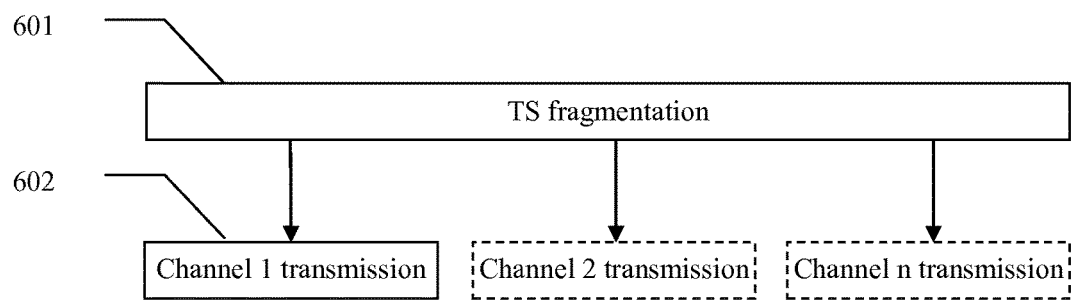
FIG. 6 shows the distribution method according to an embodiment of the invention.

FIG. 6 shows the distribution method according to an embodiment of the invention. During a first step of selection of elementary packets 601, the elementary packets of the multiplexed multimedia stream are incorporated into transport packets. As described previously and shown in FIG. 4, each of the transport packets comprises at least an elementary packet and a part only of components, and each of the transport packets is transmitted on one of the transport channels. During a transmission step 602, the transport packets of a transport channel are transmitted on the network. The method comprises as many transmission steps as there are transport channels, for example as shown in FIG. 4. This transmission step 602 comprises a step of definition of a first sequence number, noted as channel sequence number, for each of the transport packets of each of the transport channels and a second sequence number, noted as TS sequence number, for each of the elementary packets as shown in FIG. 4. The channel sequence number is incremented for each of the transport packets, the TS sequence number is incremented for each of said elementary packets.

Figure 7A:
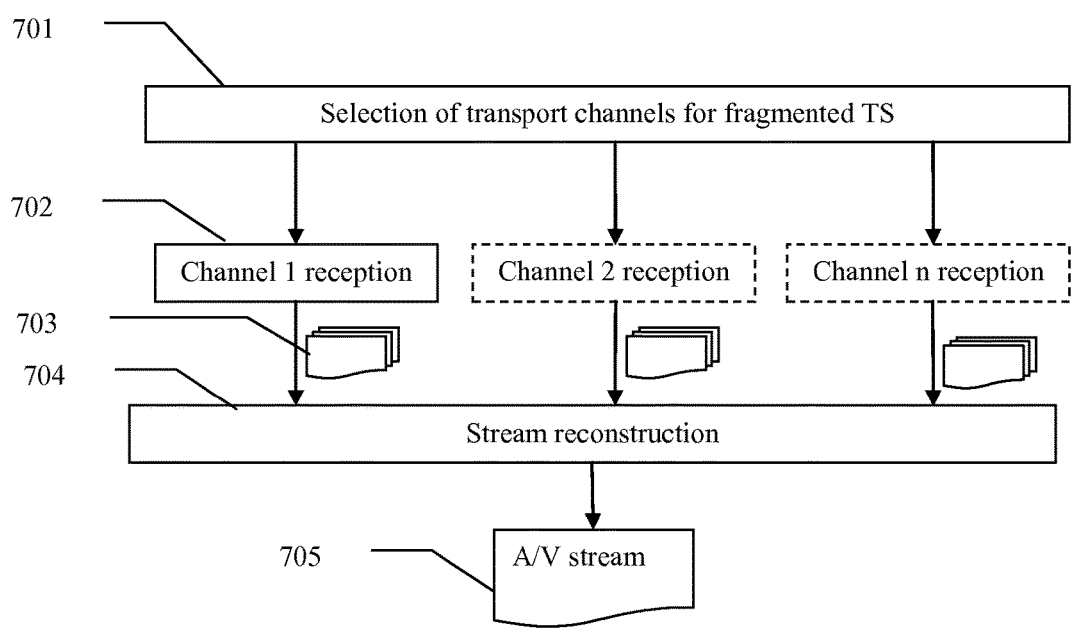
FIG. 7a shows the reception method according to an embodiment of the invention.

FIG. 7a shows the reception method corresponding to the distribution method according to an embodiment of the invention. During a first step of selection of transport channels 701, the reception terminal selects, according to the programme selected and the components selected, the transport channels carrying the transport packets from the selection of elementary packets of the multiplexed multimedia stream corresponding to these components. During a second reception step 702, the terminal stores the transport packets and orders these packets 703 using the first sequence numbers defined for each channel, these numbers incrementing with the transport packets on a given channel. This step is repeated as many times as there are transport channels selected. Finally, in a step of reconstruction of the multiplexed stream 704, the elementary packets of different channels are ordered by means of the second sequence number defined in increasing order for each of the elementary packets (PES or PSI) of the outgoing stream. According to the reception channels selected by the terminal, the stream thus reconstructed 705 corresponds to all or part of the outgoing stream. This reconstructed stream is then sent to the de-multiplexer and/or video decoder to be processed as a multiplexed multimedia stream.

Figure 11:
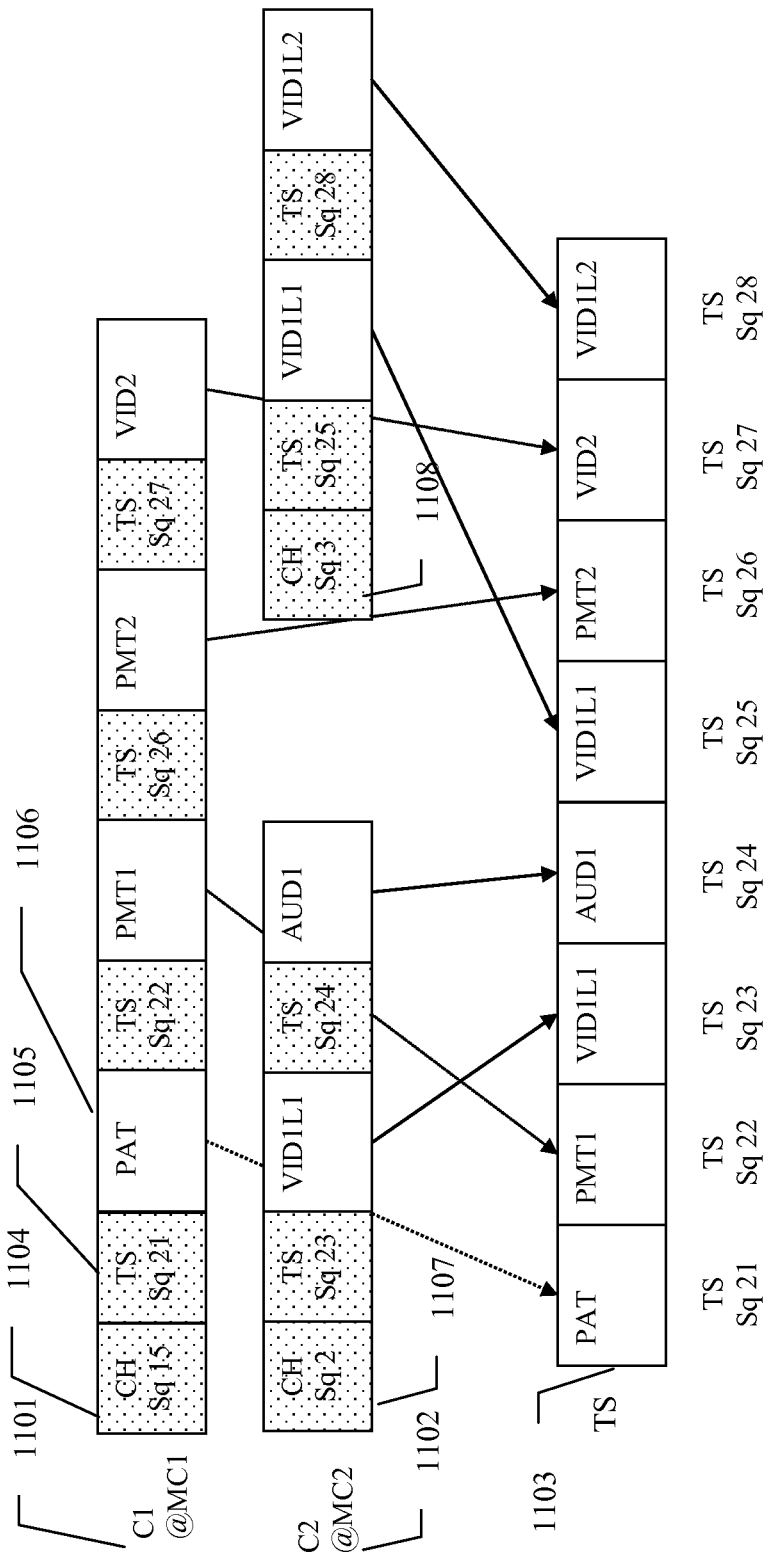
FIG. 11 shows the use of sequence numbers to order the elementary packets of the multiplexed multimedia stream.

FIG. 11 shows the use of sequence numbers to order the elementary packets of the multiplexed multimedia stream according to an embodiment of the invention. In this example, the first sequence number is the channel sequence number, the second sequence number is the TS sequence number. The terminal receives on the channel C1 1101, a transport packet for which the channel sequence number 1104 is 15. The terminal receives on channel C2 1102, two transport packets, the first for which the channel sequence number 1107 is 2, the next for which the channel sequence number 1108 is incremented by one, is 3. The transport packets received on C1 on one hand and the transport packets received on C2 on the other hand are ordered according to the channel sequence number. In addition, the transport packets comprise elementary packets of the multiplexed multimedia stream. Hence the packet received on channel C1 comprises four elementary packets 1106 (PES or PSI), corresponding to the metadata and the video of programme 2, for which the TS sequence numbers 1105 are respectively 21, 22, 26 and 27. During the step of reconstruction, the elementary packets 1106 of transport packets received on C1 and transport packets received on C2 are ordered using the TS sequence number defined for each elementary packet. The multiplexed multimedia stream comprising the ordered elementary packets is thus reconstructed. The definition of channel sequence numbers and TS sequence numbers is a simple solution to order the elementary packets of a multimedia stream transmitted on different transport channels.

Figure 10A:
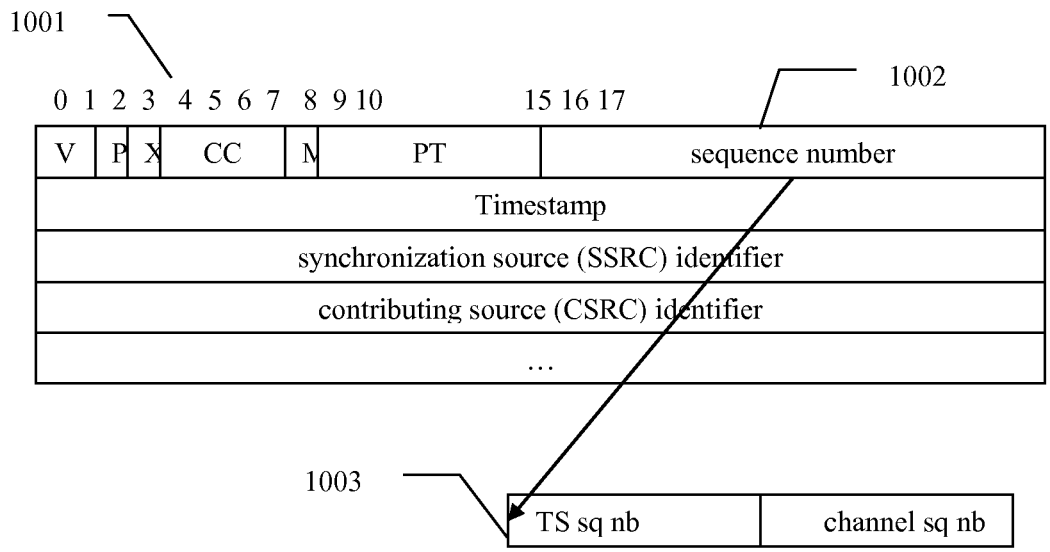
FIGS. 10a and 10b show the numbering of transport packets and elementary packets using the RTP means according to different embodiments.
Figure 10B:
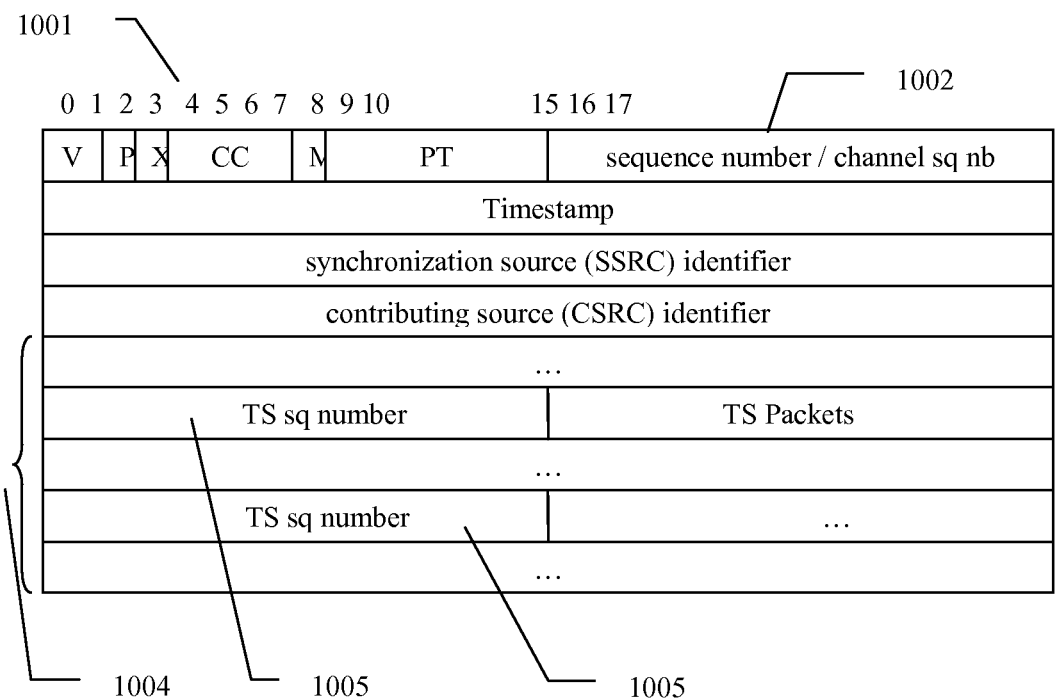

The channel sequence number and the TS sequence number are transmitted with the transport packets according to a network transport protocol. According to a particular embodiment, the transport channels correspond to multicast addresses of the IP network and use the RTP protocol. FIGS. 10a and 10b show the numbering of transport packets and elementary packets using the RTP means according to two different embodiments. FIG. 10a shows the header 1001 of a transport packet in accordance with the RTP protocol. This header comprises a sequence number field defining the order of RTP packets on a transport channel. This field is composed of 16 bits of data. According to a first embodiment, this field 1003 is used to transmit the channel and TS sequence numbers, this field 1003 is divided into two fields of 8 bits. This embodiment has the advantage of simplicity of implementation as it uses an existing field of the RTP header. However this embodiment is not compatible with a receiver that is not informed of this numbering and can use such sequence numbers. In addition, this embodiment leads to limiting the transport packet to an elementary packet as the number of TS sequence numbers is limited to one per header. In a variant shown in FIG. 10b, the field "sequence number" 1002 corresponds to the channel sequence number according to an embodiment of the invention. A new type of content 1004 of transport packets "payload" is defined, it describes a fragmented stream in which a TS sequence number field 1005 is added before each elementary packet for example a field of 16 bits preceding the 188 bytes of a PES packet of a TS stream. This embodiment overcomes the disadvantages of the use of the "sequence number" field of an RTP header to transport the TS and channel sequence numbers. In addition, the invention remains compatible with other transmission protocols for computing networks such as http or mobile networks. However, the reception terminal must be informed of the transport packet format, RTP or other, of the fragmented distribution method on several channels.

To resolve this problem, an embodiment of the invention comprises in addition a first step of transmission of a description of the content of each of the transport channels. This information advantageously informs the reception terminal for the step of selection of a transport channel. In fact, this information relates to the transport channels used, the diffusion method comprising a step of fragmentation of the multimedia stream, or on the components carried by each of the channels. According to a particular embodiment of the invention, the description of the content of each of the transport channels is comprised in a "Session Description Protocol" file noted as SDP. For example, the structure of an SDP file as defined by the IETF compatible with the invention is as follows:

v=0
o=foo 2890844526 2890842807 IN IP4 10.47.16.5
s=
t=2873397496 2873404696
m=video 10000 RTP/AVP 100
c=IN IP4 228.1.1.1/127
a=rtpmap:100 fragmentedMP2T/90000
a=fmtp:100 PSI; video main VID2
m=video 10000 RTP/AVP 100
c=IN IP4 228.1.1.2/127
a=rtpmap:100 fragmentedMP2T/90000
a=fmtp:100 video main VID1L1
m=video 10000 RTP/AVP 100
c=IN IP4 228.1.1.3/127
a=rtpmap:100 fragmentedMP2T/90000
a=fmtp:100 audio FR AC3
m=video 10000 RTP/AVP 100
c=IN IP4 228.1.1.4/127
a=rtpmap:100 fragmentedMP2T/90000
a=fmtp:100 video main VID1L1

The SDP file according to an embodiment of the invention contains a field "m" (for "media") indicating that the transport channel described transports video, that it uses the RTP transmission protocol and that the number of the data transmission port is 1000. the field "c" indicates that the transport channel corresponds to the multicast Internet address IP4 228.1.1.1. The field "a" defines a new media sub-type that is "fragmentedMP2T" This sub-type corresponds to the fragmentation of the TS stream and provides the information that there is a TS sequence number field before each TS packet of the RTP payload as previously described in a particular embodiment. For example the SDP file describes a session comprising the diffusion on 4 IP channels of metadata and a video component (PSI on C1@ IP4 228.1.1.1 and VID2 on C1@ IP4 228.1.1.1), a video component (VID1L1 on C2 @ IP4 228.1.1.2), another video component (VID1L2 on C4 @ IP4 228.1.1.4), and finally an audio component corresponding to the French language (audio FR on C3 @ IP4 228.1.1.3). The SDP descriptive files, associated with the server and the distribution method, are stored on a Web site from which they can be downloaded or in a variant can be diffused in multicast. In other variants, different standard tools defined by the IETF are used for the description of the content of each of the transport channels for example SD&S of DVB-IPTV (ETSI TS 102 034).

Finally, according to a particular characteristic, the reception terminal transmits a request for selection of multimedia components to be transmitted on a transport channel. A variant consists then in distributing the multimedia components selected via a unicast diffusion on an IP network, the transport channel corresponding to a unicast address. The selection request of multimedia components to be transmitted in a transport channel informs the server on the expected transport channel by the receiver according to its content provided for example by its description. According to another variant, the transmission protocol RTSP ("Real Time Streaming Protocol") is used to transmit a request to the server then to diffuse the selected components.

Figure 7B:
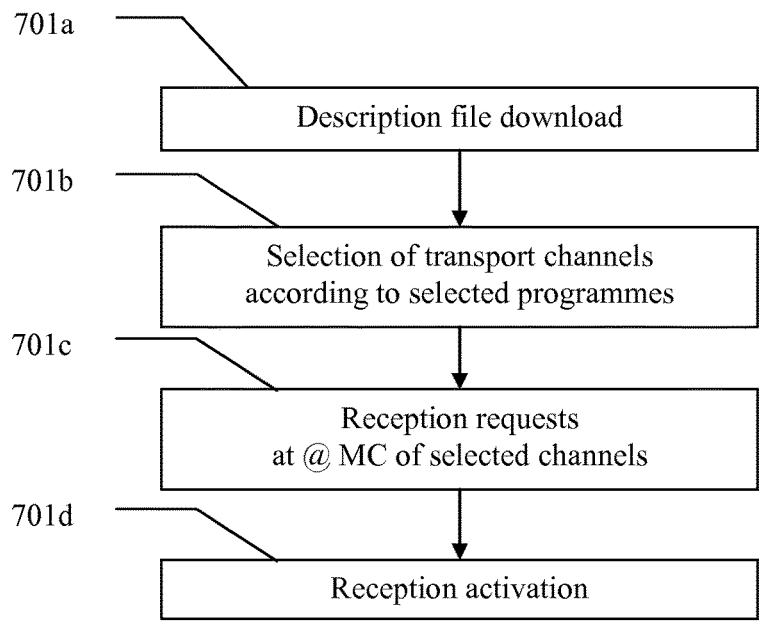
FIG. 7b shows a detailed flowchart of steps of the selection of transport channels according to an embodiment of the invention.
Figure 7C:
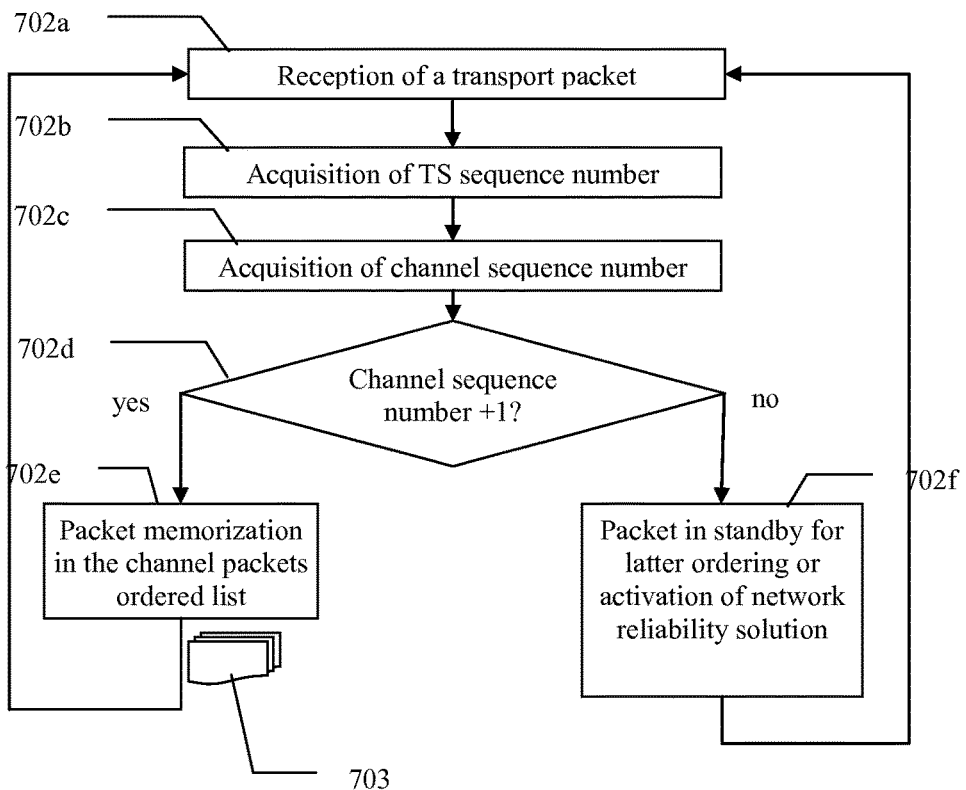
FIG. 7c shows a detailed flowchart of steps of reception of transport packets of a transport channel according to an embodiment of the invention.

In view of the characteristics previously described, FIG. 7b shows a detailed flowchart of selection steps of transport channels and FIG. 7c shows a detailed flowchart of steps of reception of transport packets of a transport channel. The steps are detailed for a multicast diffusion on an IP network using the RTP transmission protocol described in an SDP file but is not limited to this embodiment. In a first step 701a, the terminal downloads the content description file of each of the transport channels. In a variant previously described, this file is an SDP file. Using the information of the file, the terminal is able to know the distribution method then to select the transport channels according to the programme and the components selected, for example the base stream of an SVC video and the French sound associated with a programme 1. During a step 701b, the terminal sends a request on the IP network to the multicast address defined in the description file to receive the transport packets of a selected channel. The transport packets, for example RTP, are then routed and if required duplicated by the routers to the terminal. In a step 701d, the activation of a step of reception per selected channel is carried out by the terminal. The steps of a reception step are detailed in FIG. 7c. In a first step of reception 702a, the terminal receives the RTP packets. The terminal knows the distribution method and the location of channel sequence numbers and TS sequence numbers in the RTP packets. During the step 702b, the terminal carries out the acquisition of channel sequence numbers associated with transport packets. Then during step 702c, the terminal carries out the acquisition of TS sequence numbers associated with PES or PSI packets in a TS stream that will be used to order the TS packets carried on different channels. The test 702d consists in verifying the incrementing of the channel sequence number of transport packets received consecutively on a transport channel. If the test 702d is positive, the received packet is indeed the next transport packet in the transmission order, a step 702e enables the packet in the ordered list of transport packets 703 to be memorised. The terminal then returns to step 702a. If the test 702d is negative, either the packet is not received in the order of transmission, or one or several transport packets are lost on the network. During a step 702f, the terminal puts the packet on standby to be able to memorise it later in the ordered list of transport packets 703, or activate the network reliability solutions to receive the lost packets. The terminal then returns to step 702a. The channel sequence numbers advantageously enable a terminal to re-order the packets transmitted on the channel, or to detect the loss of packets on the network.

Figure 8:
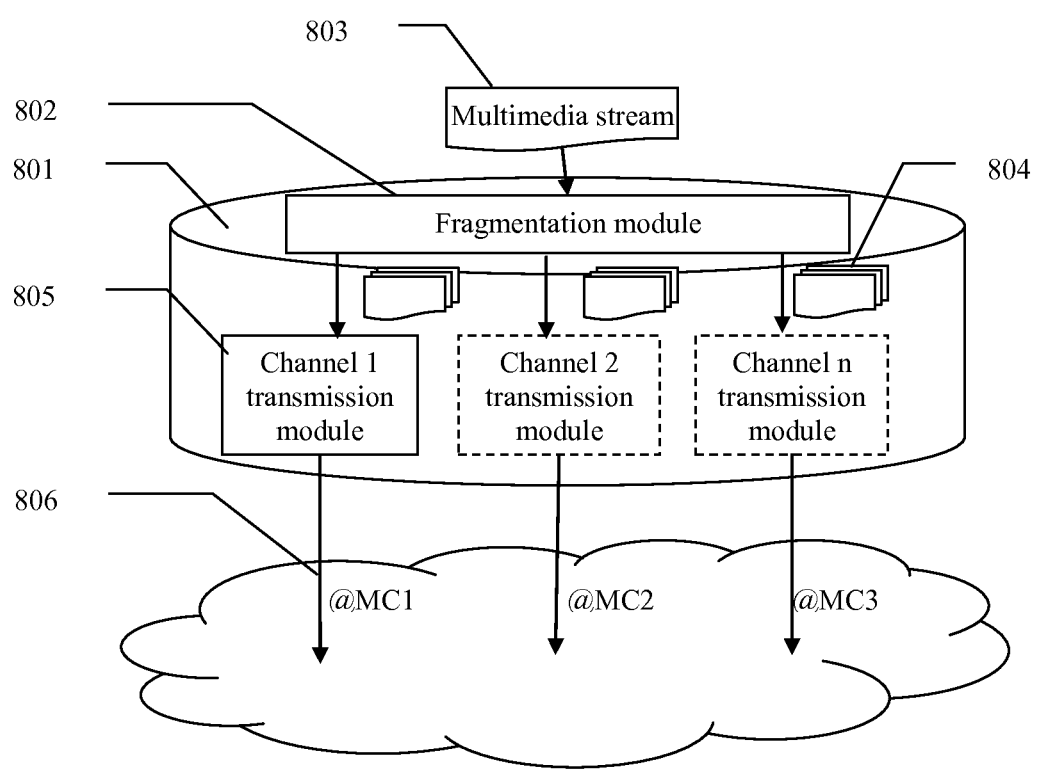
FIG. 8 shows the distribution device according to an embodiment of the invention.

FIG. 8 shows a distribution device implementing the distribution method for a multiplexed multimedia stream previously described. The distribution device 801 comprises a selection module for elementary packets 802 providing the means to divide the multiplexed multimedia stream 803 into transport packets 804 transmitted on one of the transport channels. As described previously and shown in FIG. 4, each of the transport packets comprises at least one elementary packet and a part only of the components. The distribution device 801 comprises one or several transmission modules 805 providing the means to transmit transport packets of a given channel 806. This transmission module 805 comprises means to define a first sequence number for each of the transport packets of each of the transport channels and to define a second sequence number for each of the elementary packets as shown in FIG. 4. The first sequence number is incremented for each of the transport packets independently on each of the transport channels, the second sequence number is incremented for each of said elementary packets. The transmission device is for example a computer server connected to a network. The device comprises the physical means useful in the implementation of an embodiment of the invention, for example a processor, a random access memory (for example a RAM) and a programme memory (for example a ROM).

Figure 9:
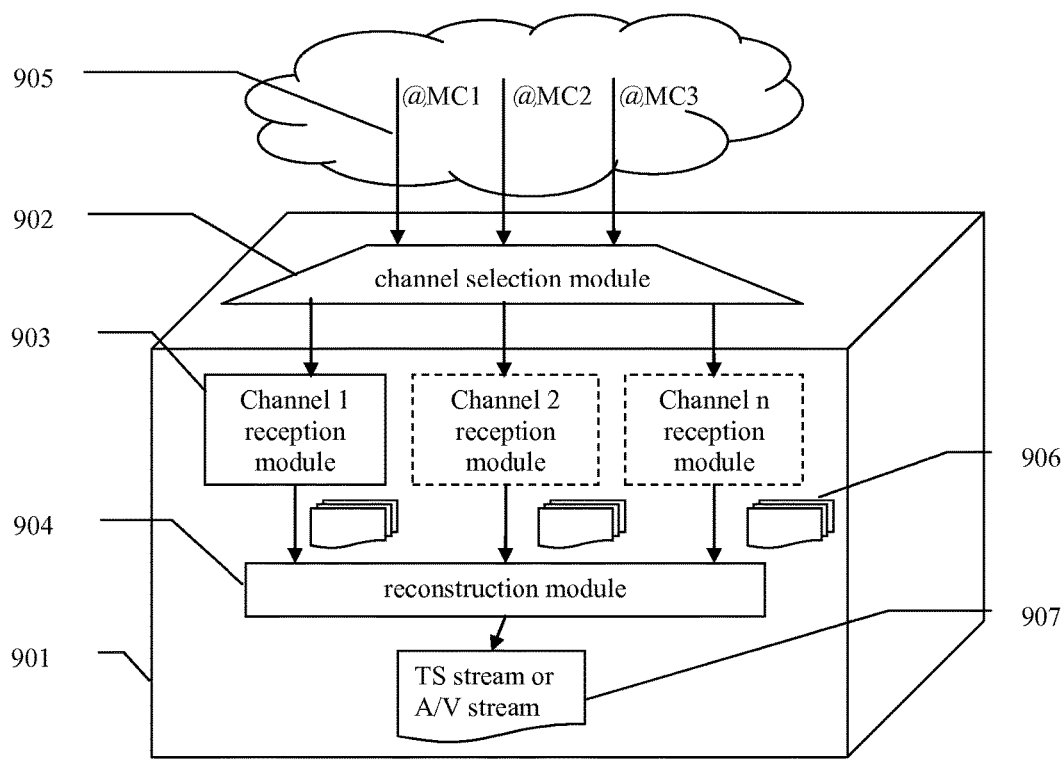
FIG. 9 shows a reception device according to an embodiment of the invention.

FIG. 9 shows a reception device implementing the reception method for a multiplexed multimedia stream previously described. The reception device 901 comprises a channel selection module 902 providing the means to select according to the programme selected and the components selected, the transport channels 905 carrying the transport packets from a selection of elementary packets of the multiplexed multimedia stream corresponding to these components. The reception device 901 also comprises one or several reception modules 903 providing the means to store transport packets and order these packets 906 using a first sequence number defined for each transport packet, this first number incrementing with the consecutive transport packets on a given channel. Finally, the reception device 901 comprises a reconstruction module 904 of the multiplexed stream 907 in which the elementary packets of different channels are ordered by means of a second sequence number defined in increasing order for each of the elementary packets (PES or PSI) of the outgoing stream. According to the reception channels selected by the reception device, the stream thus reconstructed 907 corresponds to all or part of the outgoing stream. This reconstructed stream is then sent to the demultiplexer and/or video decoder to be processed as a multiplexed multimedia stream. The reception device is for example a decoder (or "set top box") connected to a network. The device comprises the physical means useful in the implementation of an embodiment of the invention, for example a processor, a random access memory (for example a RAM) and a programme memory (for example a ROM).

Naturally, the invention is not limited to the embodiments previously described. In particular, the invention is compatible with a content distribution on mobile networks or for contents that are not scalable but encoded for multiple video formats such as the standard format Pip as well as for the contents with several audio channels corresponding to different languages such as French, English, etc.

The invention claimed is:

1. A method for distributing a multiplexed multimedia stream via a network, implemented in a transmitter, said multiplexed multimedia stream comprising multimedia and signaling components, wherein a division of said multimedia and signaling components into elementary packets generates separate elementary packets containing signaling components and elementary packets containing multimedia components and wherein elementary packets are incorporated into transport packets of a plurality of transport channels, the method comprising:

selecting said elementary packets for incorporation into transport packets, wherein each of said elementary packets containing signaling components is incorporated into a transport packet transmitted on a first transport channel, and wherein some of said elementary packets containing multimedia components are incorporated into transport packets transmitted on a plurality of different transport channels, transmitting said transport packets on each of said plurality of transport channels, wherein a respective first sequence number is defined for the transport packets transmitted on each of the plurality of transport channels and wherein a second sequence number is defined for each of said elementary packets and transmitted within the transport packets, said first sequence number for each respective transport channel being incremented, independently for each transport packet that is transmitted on the respective transport channel, said second sequence number being incremented for each of said elementary packets of said multiplexed multimedia stream, such that the second sequence number for each transport packet is not repeated in any of the other transport packets on any of the plurality of transport channels.

2. The method according to claim 1 further comprising a first step of transmission of a content description of each of said plurality of transport channels.

3. The method according to claim 2 wherein said content description of each of said at least one transport channels is comprised in a "Session Description Protocol" file noted as SDP.

4. The method according to claim 1 further comprising receiving a request for selection of said multimedia components to be transmitted in a transport channel.

5. The method according to claim 4 wherein the transmission protocol on the IP network is RTP.

6. The method according to claim 1 wherein the distribution is a multicast diffusion on an IP network.

7. The method according to claim 1 wherein the distribution is a unicast diffusion on an IP network.

8. A method for receiving a multiplexed multimedia stream via a network, implemented in a receiver, said multiplexed multimedia stream comprising multimedia and signaling components, wherein a division of said multimedia and signaling components into elementary packets generates separate elementary packets containing signaling components and elementary packets containing multimedia components and wherein elementary packets are incorporating into transport packets of a plurality of transport channels, the method comprising:

selecting at least one transport channel among the plurality of transport channels, wherein the selection comprises a first transport channel on which each of said elementary packets containing said signaling components is transmitted, and wherein the selection further comprises one of the plurality of transport channels on which some of said elementary packets containing multimedia components are transmitted, receiving said transport packets using a respective first sequence number defined for each of said transport packets on each respective transport channel, said first sequence number for each respective transport channel being incremented independently for each transport packet that is transmitted on the respective transport channel, and reconstructing said multiplexed multimedia stream using a second sequence number defined for each of said elementary packets of said multiplexed multimedia stream, said second sequence number being incremented for each of said elementary packets of said multiplexed multimedia stream, such that the second sequence number for each transport packet is not repeated in any of the other transport packets on any of the plurality of transport channels, wherein said elementary packets containing multimedia components are inserted in a reconstructed multiplexed multimedia stream comprising at least signaling components.

9. The method according to claim 8 wherein receiving said transport packets comprises a detection of loss of transport packets using said first sequence number defined for each of said transport packets.

10. The method according to claim 8 wherein said selecting at least one transport channel uses a description of the content of each of said at least one transport channels previously transmitted.

11. The method according to claim 10 wherein said description of the content of each of said at least one transport channels is comprised in a "Session Description Protocol" file noted as SDP.

12. The method according to claim 8 further comprising transmitting a request for selection of multimedia components to be transmitted in a transport channel.

13. A device for distributing a multiplexed multimedia stream via a network, said multiplexed multimedia stream comprising multimedia and signaling components, wherein a division of said multimedia and signaling components into elementary packets generates separate elementary packets containing signaling components and elementary packets containing multimedia components and wherein elementary packets are incorporating into transport packets of a plurality of transport channels, the device comprising:

a processor configured to select elementary packets for incorporation into transport packets, wherein each of said elementary packets containing signaling components are incorporated into a transport packet transmitted on a first of the plurality of transport channels, and wherein said elementary packets containing multimedia components are incorporated into transport packets transmitted on the plurality of different transport channels; and a transmitter configured to transmit said transport packets on each of said plurality of transport channels, wherein a respective first sequence number is defined on each of the plurality of transport channels and transmitted within said transport packets and wherein a second sequence number is defined for each of said elementary packets and transmitted within the transport packets, said first sequence number for each respective transport channel being incremented independently for each transport packet that is transmitted on the respective transport channel, said second sequence number being incremented for each of said elementary packets of said multiplexed multimedia stream, such that the second sequence number for each transport packet is not repeated in any of the other transport packets on any of the plurality of transport channels.

14. The device according to claim 13, wherein the processor is further configured to transmit a content description of each of said plurality of transport channels.

15. The device according to claim 14, wherein said content description of each of said at least one transport channels is comprised in a "Session Description Protocol" file noted as SDP.

16. The device according to claim 13, wherein the processor is further configured to receive a request for selection of said multimedia components to be transmitted in a transport channel.

17. The device according to claim 13, wherein the distribution comprises a multicast diffusion on an IP network.

18. The device according to claim 13, wherein the distribution comprises a unicast diffusion on an IP network.

19. The device according to claim 13, wherein the transmission protocol on the IP network is RTP.

20. A device for receiving a multiplexed multimedia stream distributed via a network, said multiplexed multimedia stream comprising multimedia and signaling components, wherein a division of said multimedia and signaling components into elementary packets generates separate elementary packets containing signaling components and elementary packets containing multimedia components and wherein elementary packets are incorporated into transport packets of a plurality of transport channels, wherein the device comprises:

a processor configured to select at least one transport channel among the plurality of transport channels from a selection of elementary packets of said multiplexed multimedia stream, wherein a first of the plurality of transport channels on which each of said elementary packets containing said signaling components are transmitted is selected, and wherein one of the plurality of transport channels on which some of said elementary packets containing multimedia components are transmitted is further selected;

a receiver configured to receive said transport packets, using a respective first sequence number defined for each of said transport packets on each respective transport channel, said first sequence number for each respective transport channel being incremented independently for each transport packet that is transmitted on the respective transport channel, and wherein said processor is further configure to reconstruct said multiplexed multimedia stream using a second sequence number defined for each of said elementary packets of said multiplexed multimedia stream, said second sequence number being incremented for each of said elementary packets of said multiplexed multimedia stream, such that the second sequence number for each transport packet is not repeated in any of the other transport packets on any of the plurality of transport channels, wherein each of said elementary packets of multimedia components are inserted in a reconstructed multiplexed multimedia stream comprising at least each of the signaling components.

21. The device according to claim 20, wherein the processor is further configured to detect a loss of transport packets using said first sequence number defined for each of said transport packets.

22. The device according to claim 20, wherein the processor is further configured to select at least one transport channel using a description of the content of each of said at least one transport channels previously transmitted.

23. The device according to claim 22, wherein said description of the content of each of said at least one transport channels is comprised in a "Session Description Protocol" file noted as SDP.

24. The device according to claim 22, wherein the processor is further configured to-transmit a request for selection of multimedia components to be transmitted in a transport channel.

* * * * *